United States Patent
Hallundbæk

(10) Patent No.: US 9,588,249 B2
(45) Date of Patent: Mar. 7, 2017

(54) DOWNHOLE WELL-OPERATION SYSTEM

(75) Inventor: Jørgen Hallundbæk, Græsted (DK)

(73) Assignee: WELLTEC A/S, Allerød (DK)

( * ) Notice: Subject to any disclaimer, the term of this patent is extended or adjusted under 35 U.S.C. 154(b) by 450 days.

(21) Appl. No.: 13/996,623

(22) PCT Filed: Dec. 22, 2011

(86) PCT No.: PCT/EP2011/073743
§ 371 (c)(1),
(2), (4) Date: Jun. 21, 2013

(87) PCT Pub. No.: WO2012/085180
PCT Pub. Date: Jun. 28, 2012

(65) Prior Publication Data
US 2013/0285830 A1    Oct. 31, 2013

(30) Foreign Application Priority Data

Dec. 23, 2010    (EP) ..................... 10196731

(51) Int. Cl.
*G01V 3/18*    (2006.01)
*G01V 11/00*    (2006.01)
*E21B 47/12*    (2012.01)

(52) U.S. Cl.
CPC ............. *G01V 3/18* (2013.01); *E21B 47/12* (2013.01); *G01V 11/002* (2013.01)

(58) Field of Classification Search
None
See application file for complete search history.

(56) References Cited

U.S. PATENT DOCUMENTS 4,583,093 A * 4/1986 Beals .................... 340/855.3
6,396,415 B1    5/2002 Bulmer
(Continued)

FOREIGN PATENT DOCUMENTS

CN    2881754 Y    3/2007
CN    101158284 A    4/2008
(Continued)

OTHER PUBLICATIONS

International Search Report for PCT/EP2011/073743 mailed Jul. 5, 2012.
(Continued)

*Primary Examiner* — Quan-Zhen Wang
*Assistant Examiner* — Chico A Foxx
(74) *Attorney, Agent, or Firm* — Nixon & Vanderhye PC

(57) ABSTRACT

The present invention relates to a downhole well-operation system for operating a driving unit and a logging tool downhole and transmitting well-logging data from at least one logging tool to a surface data acquisition system by means of a wireline. The system comprises a surface transceiver, a wireline, a downhole transceiver, a logging tool, and a driving unit, wherein the downhole transceiver is coupled to the surface transceiver via the wireline and communicates to the surface transceiver using orthogonal frequency division multiplexing to transmit data via the wireline by modulating a Pulse Width Modulated (PWM) signal to the wireline by means of a transistor bridge, while the driving unit and at least one logging tool is powered by the wireline. Furthermore, the invention relates to a downhole tool.

13 Claims, 4 Drawing Sheets

(56) References Cited

U.S. PATENT DOCUMENTS

| | | | |
|---|---|---|---|
| 6,580,751 B1 | 6/2003 | Gardner et al. | |
| 6,937,159 B2 | 8/2005 | Hill et al. | |
| 7,012,505 B1* | 3/2006 | Arden | 370/330 |
| 2003/0010492 A1 | 1/2003 | Hill et al. | |
| 2003/0075361 A1* | 4/2003 | Terry et al. | 175/61 |
| 2004/0085988 A1 | 5/2004 | Gardner et al. | |
| 2006/0022839 A1* | 2/2006 | Hall | G01V 11/002 |
| | | | 340/853.1 |
| 2009/0308656 A1* | 12/2009 | Chitwood et al. | 175/40 |
| 2009/0321070 A1* | 12/2009 | Hernandez-Marti | 166/244.1 |
| 2010/0073189 A1* | 3/2010 | Mandal et al. | 340/853.3 |
| 2010/0295702 A1 | 11/2010 | Zhao et al. | |
| 2012/0037354 A1* | 2/2012 | McCoy et al. | 166/65.1 |

FOREIGN PATENT DOCUMENTS

| | | |
|---|---|---|
| CN | 201610752 U | 10/2010 |
| GB | 2 352 150 A | 1/2001 |
| GB | 2 352 376 A | 1/2001 |

OTHER PUBLICATIONS

International Preliminary Report on Patentability for PCT/EP2011/073743 mailed Apr. 2, 2013.
First Office Action mailed Jun. 24, 2015 in Chinese Application No. 201180061907.3, with English translation (17 pages).

* cited by examiner

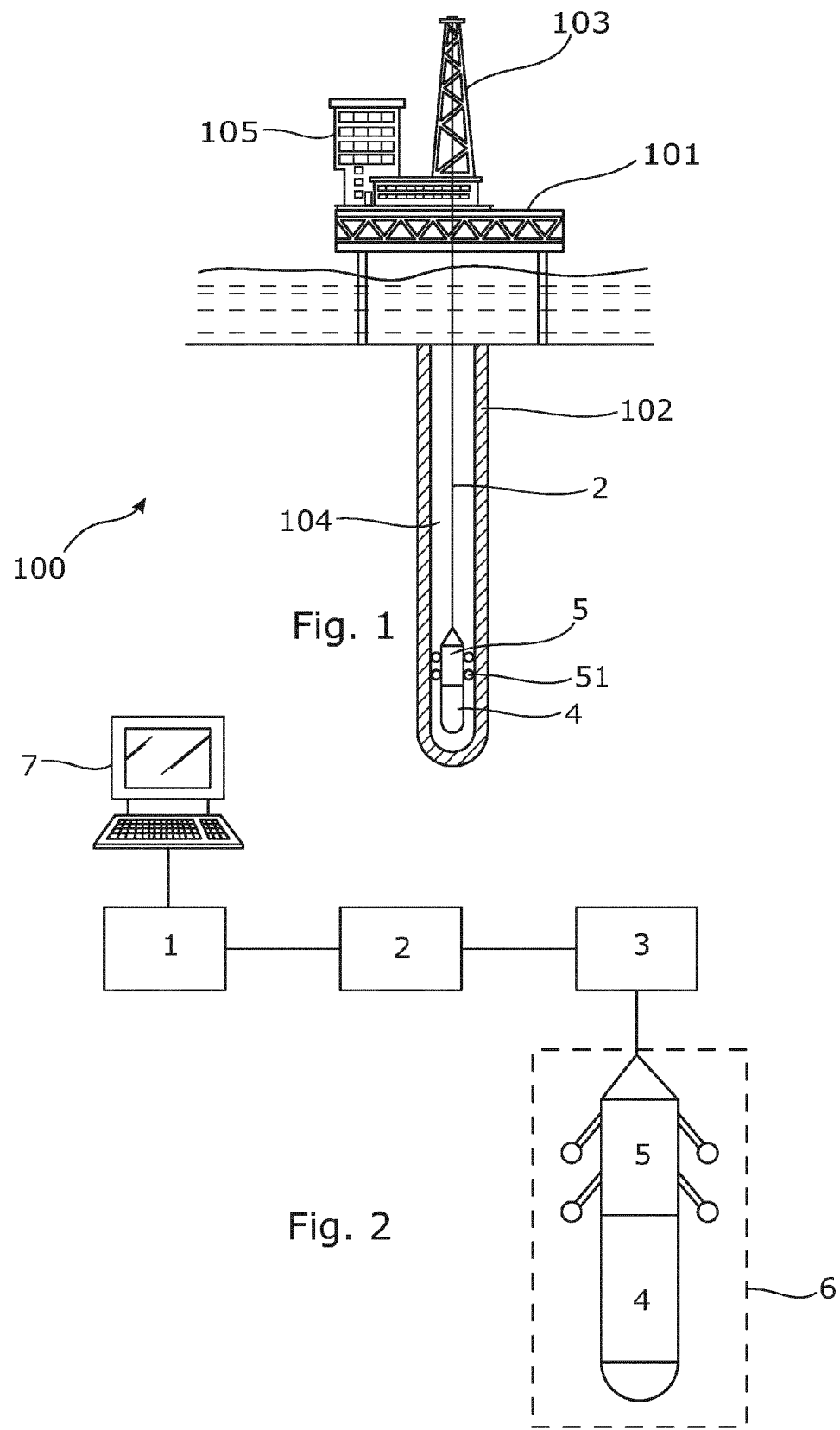

DOWNHOLE WELL-OPERATION SYSTEM

This application is the U.S. national phase of International Application No. PCT/EP2011/073743 filed 22 Dec. 2011 which designated the U.S. and claims priority to EP 10196731.3 filed 23 Dec. 2010, the entire contents of each of which are hereby incorporated by reference.

FIELD OF THE INVENTION

The present invention relates to a downhole well-operation system for operating a driving unit and a logging tool downhole and transmitting well-logging data from at least one logging tool to a surface data acquisition system by means of a wireline. Furthermore, the invention relates to a downhole tool.

BACKGROUND ART

Modem petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which is commonly referred to as "logging", can be performed using several methods.

In conventional oil well wireline logging, a probe, which is housing formation sensors, is lowered into the borehole when the well, or parts of the well, has been drilled, and is used to determine certain characteristics of the formations traversed by the borehole. The upper end of the probe is attached to a conductive wireline that suspends the probe in the borehole. Power is transmitted to the sensors and instrumentation in the probe through the conductive wireline. Similarly, the instrumentation in the probe communicates information to the surface by means of electrical signals transmitted through the wireline.

An alternative logging method is collecting data during the drilling process. Collecting and processing data during the drilling process eliminates the necessity of removing or tripping the drilling assembly to insert a wireline logging tool. It consequently allows the driller to make accurate modifications or corrections as needed to optimise performance while minimising downtime.

Designs for measuring conditions downhole including the movement and location of the drilling assembly contemporaneously with the drilling of the well have come to be known as "measurement-while-drilling" techniques, or "MWD". Typically, the downhole sensors employed in MWD applications are positioned in a cylindrical drill collar which is positioned close to the drill bit. The MWD system then employs a system of telemetry in which the data acquired by the sensors is transmitted to a receiver located on the surface.

There are a number of telemetry systems in the prior art which seek to transmit information regarding downhole parameters up to the surface without requiring the use of a wireline. Of these, the mud pulse system is one of the telemetry systems most widely used for MWD applications. The mud pulse system of telemetry creates "acoustic" pressure signals in the drilling fluid which is circulated under pressure through the drill string during drilling operations. The information acquired by the downhole sensors is transmitted by suitably timing the formation of pressure pulses in the mud stream. The information is received and decoded by a pressure transducer and computer at the surface. One problem with mud pulse systems is the data transfer rate which for increased amounts of information becomes insufficient.

An alternative to the mud pulse system is to use the wireline used to lower a logging tool into the borehole. Data transfer via a wireline has been developed by using discrete multi-tone modulation (DMT). Such a system typically comprises a surface transceiver, a cable and a downhole transceiver coupled to the surface transceiver via the cable. The downhole transceiver communicates to the surface transceiver using DMT modulation to transmit telemetry information over a set of frequency sub channels allocated for uplink communications. The surface transceiver may likewise communicate to the downhole transceiver using DMT modulation to transmit information over a set of frequency sub-channels allocated for downlink communications. The number of uplink and downlink communications sub-channels is preferably variable, and can preferably be changed depending on the operating mode of the system. This allows additional sub-channels to be allocated for downlink communications during programming and configuration of the downhole equipment, and additional sub-channels to be allocated for uplink communications during normal logging operations.

However, downhole operation becomes increasingly demanding in terms of supplied power to a downhole operating system. The use of driving units for being able to move around in the borehole, the use of one or several logging techniques in one downhole operating system and typically the use of several different power tools to alter or maintain the well have increased the need for downhole power significantly. When increasing the power supplied to a wireline, higher data transmission voltages are needed for transmitting data by means of DMT due to an increasing noise level stemming from an increased supply voltage. Merely increasing the data transmission voltage in known systems leads to more dissipated heat in the electronics of the data transmission system, which is a common problem in downhole operation tools, since heat transfer can be practically impossible in a downhole environment. The increased dissipation of heat limits the ability to transfer data at high rates while providing high power for the downhole operation system in known systems.

Information is the key to being profitable in the oil and gas industry. The more information one has regarding location and migration patterns of hydrocarbons within a hydrocarbon reservoir, the more likely it is that that reservoir can be tapped at its optimal location and utilised to its full potential. To this end, new and more sophisticated sensor arrangements are routinely created and placed in wireline probes, so much so that the information carrying capacity of traditional wireline telemetry techniques are becoming inadequate. Also due to the increased need for power in downhole operation systems, it would be desirable to have a communication technique which can support both high speed communications between downhole sensors and a surface installation while providing a high power to the downhole operation system.

SUMMARY OF THE INVENTION

It is an object of the present invention to wholly or partly overcome the above disadvantages and drawbacks of the prior art. More specifically, it is an object to provide an improved downhole operation system for operating a driving unit and at least a logging tool, and to transfer data from the logging tool to the surface.

The above objects, together with numerous other objects, advantages, and features, which will become evident from the below description, are accomplished by a solution in accordance with the present invention by a downhole well-operation system for operating a driving unit and a logging tool downhole and transmitting well-logging data from at least one logging tool to a surface data acquisition system by means of a wireline, the system comprising:

a surface transceiver,
a wireline,
a downhole transceiver,
a logging tool, and
a driving unit wherein the downhole transceiver is coupled to the surface transceiver via the wireline and communicates to the surface transceiver using orthogonal frequency division multiplexing to transmit data via the wireline, and wherein the driving unit and at least one logging tool is powered by the wireline by modulating a Pulse Width Modulated (PWM) signal to the wireline by means of a transistor bridge, while the driving unit and at least one logging tool is powered by the wireline.

In an embodiment, the wireline may be a mono cable.

In another embodiment, a data transmission signal may be modulated by an alternating signal voltage of preferably more than 30 volts, even more preferably more than 40 volts, and even more preferably more than 50 volts.

Moreover, a modulating unit may be coupled to a power supply circuit by means of a capacitive coupling.

In addition, the amplification of the transmitted signal may be Pulse Width Modulated by means of a transistor bridge.

In an embodiment, a modulating unit may be coupled to a power supply circuit by means of a capacitive coupling.

Furthermore, a supply voltage applied to the wireline at the surface may be at least 600 volts, preferably at least 800 volts, more preferably at least 1000 volts, and even more preferably at least 1200 volts during a current draw of at least 4 amperes, preferably at least 6 amperes, more preferably at least 8 amperes, and even more preferably at least 10 amperes.

Moreover, the wireline may be at least 10 kilometres long, preferably at least 15 kilometres long, and more preferably at least 20 kilometres long.

The invention furthermore relates to a downhole tool, wherein a signal voltage may be Pulse Width Modulated by a transistor bridge.

Furthermore, a modulating unit may be coupled to a power supply circuit by means of a capacitive coupling.

Finally, the voltage applied to the downhole tool may be at least 400 volts, preferably at least 500 volts, more preferably at least 600 volts, and even more preferably at least 700 volts during a current draw of at least 4 amperes, preferably at least 6 amperes, more preferably at least 8 amperes, and even more preferably at least 10 amperes.

BRIEF DESCRIPTION OF THE DRAWINGS

The invention and its many advantages will be described in more detail below with reference to the accompanying schematic drawings, which for the purpose of illustration show some non-limiting embodiments and in which FIG. 1 shows a downhole operation system according to the invention for downhole operation and logging of well and formation characteristics, FIG. 2 shows a schematic view of the data transmission between an uphole computer and a downhole operating system according to the invention.

Figure 3:
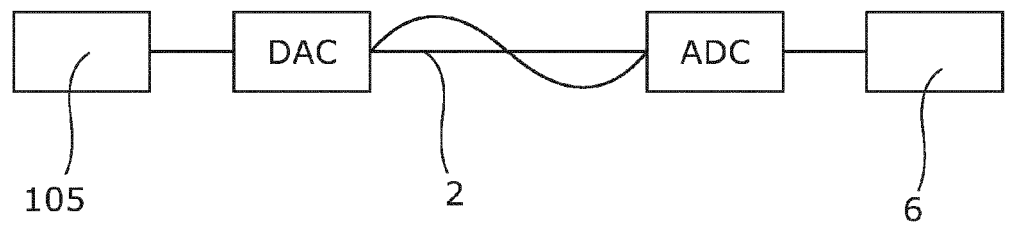
FIG. 3 shows a schematic view of the data transmission steps using a wireline.

All the figures are highly schematic and not necessarily to scale, and they show only those parts which are necessary in order to elucidate the invention, other parts being omitted or merely suggested.

DETAILED DESCRIPTION OF THE INVENTION

FIG. 1 shows a downhole operation system 100 for operating a driving unit 5 and a logging tool 4 and transmitting data from the logging tool 4 to the surface via a wireline 2. A downhole tool string 6 is shown submerged into the well via a wireline 2 from a rig or vessel 101. The vessel 101 comprises a lowering means 103 in the form of a crane. The lowering means 103 is connected to a downhole tool string 6 via the wireline 2 for lowering the downhole tool string 6 into the casing 102 of the borehole 104. FIG. 2 is a schematic view of the downhole well-operation system 100 for operating a driving unit 5 and a logging tool 4 downhole and transmitting well-logging data from at least one logging tool to a surface data acquisition system 105 by means of a wireline 2. The system 100 comprises a surface transceiver 1 for sending and receiving data via the wireline 2 to and from a downhole transceiver 3 coupled to the surface transceiver via the wireline 2, wherein the downhole transceiver communicates to the surface transceiver by means of orthogonal frequency division multiplexing to transmit data via the wireline 2 by modulating a Pulse Width Modulated (PWM) signal to the wireline by means of a transistor bridge, and while a signal voltage is pulse width modulated (PWM) by means of a transistor bridge. This allows for simultaneous high power and high data transmission through the wireline without risking high heat dissipation downhole. The downhole tool string 6 comprises a driving unit 5 used to navigate the tool string 6 within the borehole 104 by means of wheels 51 engaging the casing 102 of the borehole 104. The tool string 6 furthermore comprises a logging tool 4 for logging characteristics information.

The logging tool 4 may log characteristic information on the formation surrounding the borehole 104, information on the condition of the casing 102 of the borehole 104, or other downhole structures, such as valves or reinforcements of the casing 102. The downhole operation system 100 comprises a driving unit 5 and at least one logging tool 4, both powered by the wireline 2. Since time is a very important factor when exploiting oil wells, especially off-shore oil wells due to an extremely high cost of running oil rigs and vessels, operational time in the well must always be considered very carefully. Working with power tools downhole, such as cleaning tools, and navigating such tools in the borehole 104 by a driving unit 5 is increasingly used and requires high power and thereby high voltages provided for the downhole tool strings 6. Furthermore, several downhole logging tools 4 for logging characteristics information on the formation surrounding the borehole 104 or on the casing 102 are also widely used, and several ways of transmitting data from such logging tools exist.

Changing between a tool string 6 comprising power tools and a tool string comprising logging tools is time-consuming and very costly and should therefore be avoided. Simultaneous operation of power-consuming tools while transmitting logging data at a high transfer rate has been problematic due to increased levels of noise when applying high voltages to the wireline 2. However, the use of orthogonal frequency-division multiplexing (OFDM) modulation for transmitting data via the wireline 2 according to this invention enables simultaneous high transfer rate transmission of data and supply of high voltages. Therefore, a downhole operation system 100 according to the invention is able to avoid the compromise between data transfer rate and downhole power supply.

The driving unit 4 requires a high voltage to be able to operate satisfactorily, and due to the high attenuation of the voltage applied at the surface when working with very long cables typically more than 10 kilometres and in some instances exceeding 15 kilometres, the supplied voltage at the surface must be high when high voltages are required downhole. For instance, if 600 volts are required downhole, 1200 volts may have to be applied at the surface due to attenuation. Therefore, working with high voltages in a downhole operation system requires a high supply voltage $V2$ at the surface, which as a consequence requires a high signal voltage $V1$ to ensure sufficient signal-to-noise ratio at high data transfer rates. Therefore, a downhole well-operation system 100 according to the invention may typically use a data transmission signal 51 modulated by a high alternating signal voltage $V1$, e.g. a signal voltage of 50 volts and a supply voltage of 1200 volts. If the required supply voltage $V2$ is lower, a lower signal voltage $V1$ can be sufficient and vice versa.

FIG. 3 shows a simplified schematic view of the use of a wireline 2 to transmit data. The logging tool 4 provides a bit stream which is converted into an analogue signal by means of electrical circuits comprising components, such as digital-to-analogue converters (DAC), Quadrature Amplitude Modulators (QAM) and/or Pulse Width Modulators (PWM), and the analogue signal is subsequently transmitted through the wireline 2. At the surface, the analogue signal is then received from the wireline 2 and subsequently converted back into a digital bit stream by means of electrical circuits comprising components, such as digital-to-analogue converters (DAC), Quadrature Amplitude Modulators (QAM) and/or Pulse Width Modulators (PWM), and the digital signal is subsequently transmitted to a processing means, such as a computer.

Figure 4:
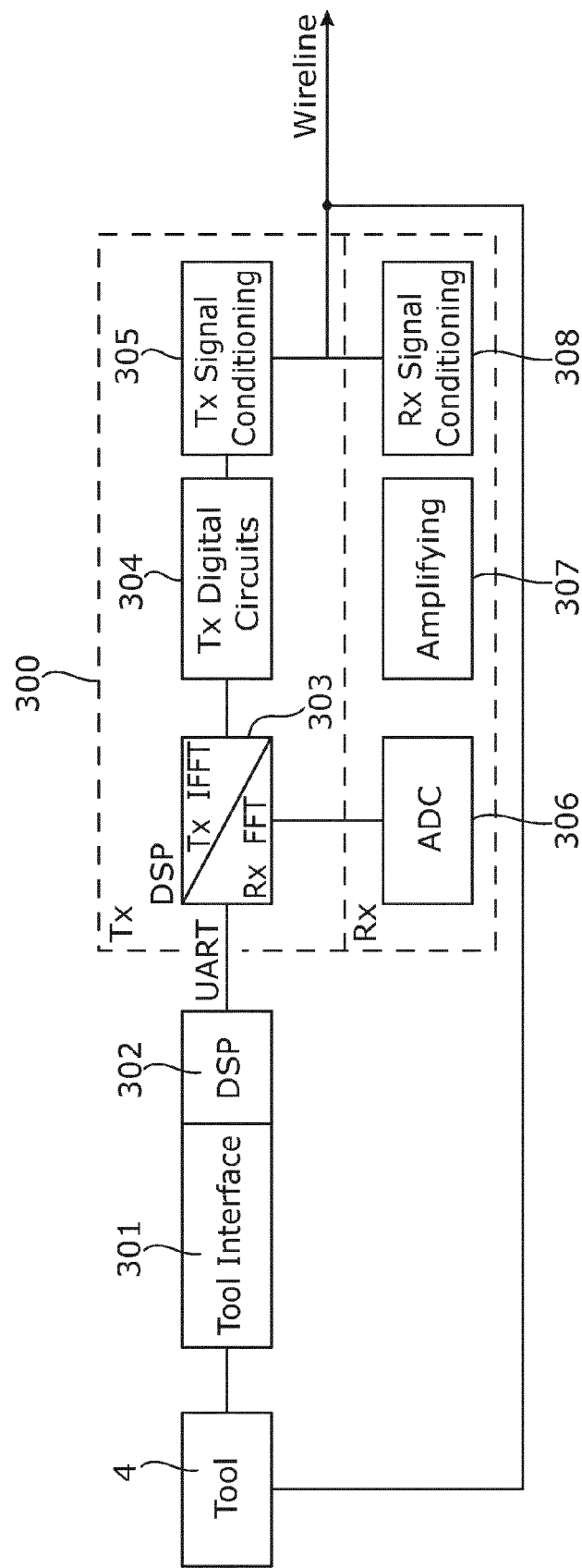
FIG. 4 shows an electrical diagram of a modulator circuit according to the invention.

FIG. 4 shows a more detailed schematic view of a circuit according to the invention, modulating the signal in the downhole tool string 6, which may be placed in the logging tool 4 or elsewhere in the tool string 6 and be electrically connected in one end to the wireline 2 and in the other end to the tool 4. The tool 4 is connected to a modulating circuit 300 through a tool interface 301 and a tool interface digital signal processor (DSP) 302. The tool interface DSP 302 is optionally connected to the modulating circuit 300 through a universal asynchronous receiver/transmitter (UART). The modulating circuit 300 comprises a modulating DSP 303 connected to the tool interface DSP 302 for two purposes. First, when receiving a signal from the tool 4, i.e. logged data, the modulating DSP 303 transmits (Tx) the inverse fast Fourier transform (IFFT) of the signal to transmitting circuits 304 and further to a signal conditioning means 305 and again further towards the wireline 2. Second, the purpose of the modulating DSP 303 is that when signals are received (Rx) from the wireline 2, the signal from the wireline passes through a receiving signal conditioning 308 to an amplifier 307 and is converted by an analogue-to-digital converter (ADC). Subsequently, the received signal is transformed by the modulating DSP 303 which uses fast Fourier trans-form (FFT)) and QAM symbol mapping to convert the signal into a bit stream of the signal to the tool interface DSP 302 and further on to the tool 4 in order to control the tool. The transmitting part 303, 304, 305 of the modulating circuit 300 may be connected in parallel with the receiving part 303, 306, 307, 308 of the modulating circuit, as shown in FIG. 4.

Figure 5:
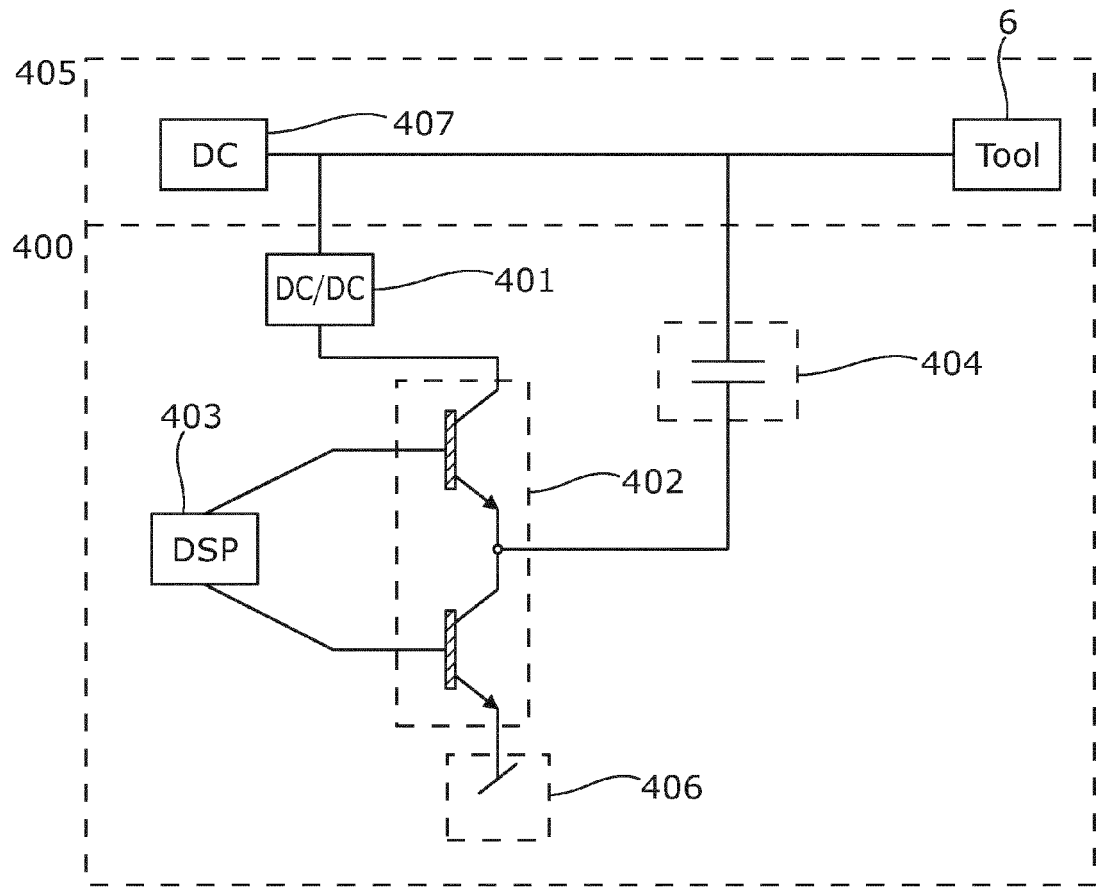
FIG. 5 shows a downhole operation tool according to the invention.

FIG. 5 shows an embodiment of the modulating unit 400 comprised by a DC/DC converter 401 which supplies a modulating voltage and a transistor half bridge 402 which is able to modulate a Pulse Width Modulated (PWM) signal to the wireline 2 by receiving a control signal from a transistor DSP 403. The modulating unit 400 is protected from high supply voltage by a capacitive coupling 404. The advantage of using a capacitive coupling 404 in this type of circuit is that the typical alternative to the capacitive coupling is an inductive coupling. The inductive coupling has the downhole disadvantages of dissipating more heat due to the high current needed for the tool string 6 than the capacitive coupling 404, and furthermore, an inductive coupling suited for high currents is bigger than the capacitive coupling, which is also a disadvantage in downhole equipment. By using a PWM modulated transistor bridge 402, the use of linear or near linear amplifiers is avoided. Linear amplifiers are usually preferred when a very smooth signal is required, such as in high-end audio amplifiers. However, the linear amplifier dissipates more heat than a PWM modulated transistor bridge, which is a disadvantage in downhole equipment and especially when modulating high voltages, which is required on long cables due to the high attenuation of the cable, such as modulating a 600 volts supply voltage $V2$ with a 50 volts signal voltage $V1$ modulating the supply voltage $V2$ from 575 volts to 625 volts using a transistor half bridge 402. The transistor bridge 402 receives a PWM modulated control signal from the transistor DSP 403. The signal voltage $V1$ is provided by the DC/DC converter 401 and grounded by a ground connection 406, such as a connection to the casing or chassis of the tool 4.

When operating downhole with a downhole well-operation system 100 according to the invention, the supply voltage $V2$ applied to the wireline 2 at the surface is very high, preferably at least 600 volts, more preferably at least 800 volts, even more preferably at least 1000 volts, and most preferably at least 1200 volts during a current draw of at least 4 amperes, preferably at least 6 amperes, more preferably at least 8 amperes, and even more preferably at least 10 amperes. This high voltage is needed in order to operate the driving unit 5, also known as a well tractor. A well tractor is typically used to navigate a long tool string 6, such as the one depicted in FIG. 6, comprising logging tools 4 and other tools, such as stroker tools, cleaning tools, milling tools etc. and therefore requires an extensive amount of power to operate all or several tools and the driving unit 5 simultaneously.

In an embodiment of the invention, the wireline 2 is at least 10 kilometres long, preferably at least 15 kilometres long and more preferably at least 20 kilometres long. The invention is particularly relevant when working with very long wirelines 2 due to the high attenuation of signals in long wirelines, which increases the need for working with high voltages in order to obtain high power output downhole.

Figure 6:
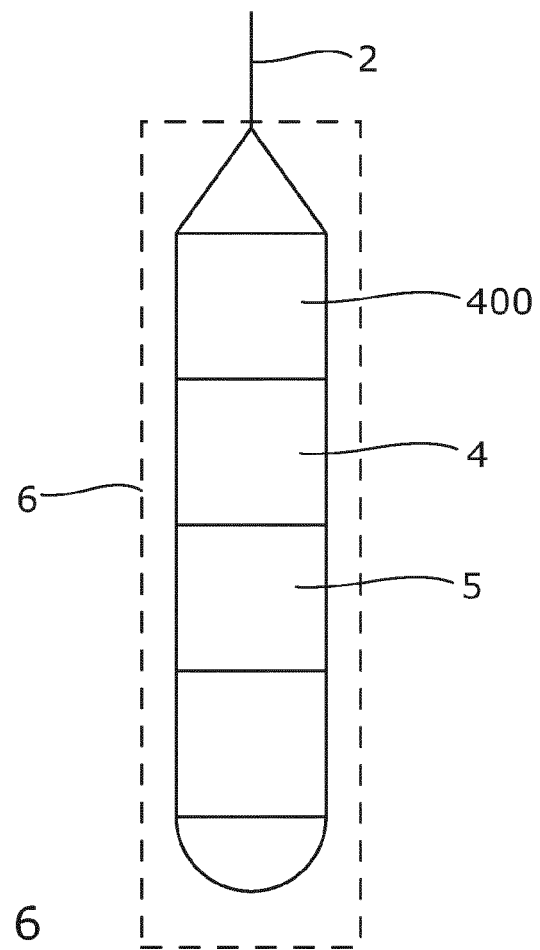
FIG. 6 shows a schematic view of a modulator circuit according to the invention.

FIG. 6 shows a downhole tool 200 being attachable to a wireline 2 and comprising a modulating unit 400 connected to a logging tool 4 and a driving unit 5.

Figure 7:
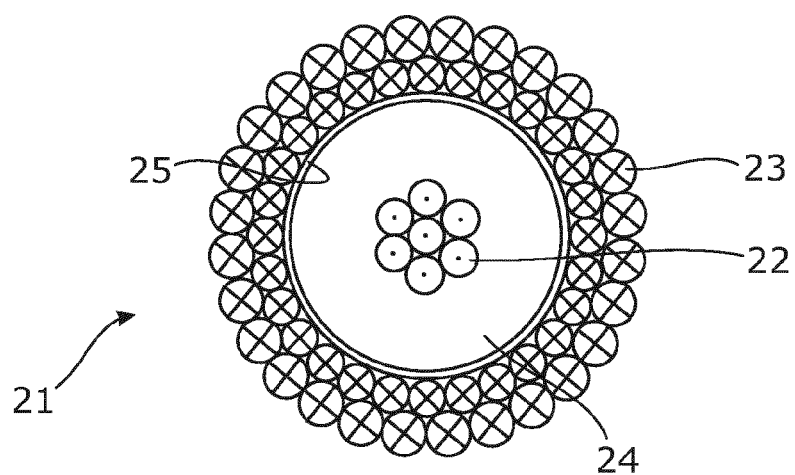
FIG. 7 shows a cross-sectional view of a mono cable.

FIG. 7 shows a cross-sectional view of a mono cable 21. The mono cable 21 comprises an inner conductor 22 surrounded by a flexible, tubular insulating layer 24, e.g. a Teflon layer, which is surrounded by an outer layer 25, often referred to as a jacket or jacket layer. Exterior to the jacket 25, a tubular conducting shield comprising a plurality of return conductors 23 is wound around the cable. The tubular conducting shield is sometimes referred to as the armour of the cable since it protects the cable. Furthermore, a mono cable, such as the one depicted in FIG. 7, comprises two armour layers comprising a plurality of return conductors 23; one layer wound in one direction and one layer wound in the other (not shown in FIG. 7), such that when the cable is twisted, one layer loosens and one layer tightens simultaneously, which strengthens the cable. In other monocables, a separate coaxial shielding layer acts as the return conductor. The use of mono cables 21 offers some important advantages over multi-conductor cables when working in a downhole environment. The mono cable 21 is widely used on oil and gas exploitation facilities and therefore provides easy and cheap accessibility on sites where a downhole operation system 100 according to the invention is intended to be used. Furthermore, when exploiting offshore well-sites, and especially deep-water well-sites, the safety of the well depends on pressure protection between the borehole and seawater. This pressure protection typically comprises a grease injector head for sealing off the well during wireline operations. The size of the grease injector head is proportional to the thickness of the cable that needs to be sealed off, and the thicker the cable, the more difficult it is for the grease injector head to seal of the well, which in addition to the difficulties increases cost on both cable and grease injector head. Furthermore, a grease injector head leaks a portion of the grease into the sea environment, which is also proportional to the thickness of the cable, and hence, a thicker cable leads to more pollution of the sea environment.

By fluid or well fluid is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oilcontaining fluid, etc. Gas, oil, and water fluids may thus all comprise other elements or substances than gas, oil, and/or water, respectively.

By a casing is meant any kind of pipe, tubing, tubular, liner, string etc. used downhole in relation to oil or natural gas production.

In the event that the tools are not submergible all the way into the casing, a downhole tractor can be used to push the tools all the way into position in the well. A downhole tractor is any kind of driving tool capable of pushing or pulling tools in a well downhole, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. A downhole well-operation system for operating a driving unit and at least one logging tool downhole and transmitting well-logging data from the at least one logging tool to a surface data acquisition system by means of a wireline, the system comprising:
   a surface transceiver,
   the wireline,
   a downhole transceiver,
   the at least one logging tool, and
   the driving unit
   wherein the wireline is a mono cable configured to supply direct current supply voltage to power the driving unit and the downhole transceiver is coupled to the surface transceiver via the mono cable and configured to communicate with the surface transceiver using orthogonal frequency division multiplexing to transmit data via the mono cable by modulating a Pulse Width Modulated (PWM) signal to the mono cable by means of a transistor bridge, while the driving unit and the at least one logging tool are powered by the mono cable,
   wherein the transistor bridge is coupled between ground and a voltage source and is configured to receive a PWM modulated control signal from a digital signal processor (DSP), and to modulate said PWM signal to the mono cable by receiving the PWM modulated control signal from the DSP; and
   wherein the voltage source is configured to convert direct current supply voltage provided to the driving unit via the mono cable to provide direct current voltage to the transistor bridge that is lower than the direct current supply voltage provided to driving unit over the mono cable.

2. A downhole well-operation system according to claim 1, wherein a data transmission signal is modulated by an alternating signal voltage.

3. A downhole well-operation system according to claim 1, wherein the transistor bridge is coupled to a power supply circuit including the mono cable by means of a capacitive coupling.

4. A downhole well-operation system according to claim 1, wherein an amplification of the transmitted signal is Pulse Width Modulated by means of the transistor bridge.

5. A downhole well-operation system according to claim 1, wherein an output of the transistor bridge is directly coupled to the mono cable by means of a capacitive coupling.

6. A downhole well-operation system according to claim 1, wherein a supply voltage applied to the mono cable at the surface is at least 600 volts during a current draw of at least 4 amperes.

7. A downhole well-operation system according to claim 1, wherein the mono cable is at least 10 kilometres long.

8. A downhole well-operation system according to claim 1, wherein the transistor bridge includes a first transistor and a second transistor, an emitter of the first transistor is coupled to a collector of the second transistor, the DSP provides control signals to a base of the first transistor and a base of the second transistor, and an output of the transistor bridge is coupled to the emitter of the first transistor and to the mono cable via capacitive coupling.

9. A downhole well-operation system according to claim 1, wherein the transistor bridge includes a first transistor and a second transistor coupled to the first transistor, the DSP provides control signals to a base of the first transistor and a base of the second transistor, and an output of the transistor bridge is directly coupled to the mono cable via capacitive coupling.

10. A downhole tool comprising a downhole transceiver adapted to be coupled to a surface transceiver via a wireline and communicates to the surface transceiver using orthogonal frequency division multiplexing to transmit data via the wireline by modulating a Pulse Width Modulated (PWM) signal to the wireline by means of a transistor bridge, while a driving unit and at least one logging tool are powered by the wireline, wherein the wireline is a mono cable configured to supply direct current supply voltage to power the driving unit and a signal voltage is Pulse Width Modulated by a transistor bridge, wherein the transistor bridge is coupled between ground and a voltage source and is configured to receive a PWM modulated control signal from a digital signal processor (DSP), and to modulate said PWM signal to the mone cable by receiving the PWM modulated control signal from the DSP, and wherein the voltage source is configured to convert direct current supply voltage provided to the driving unit via the momo cable to provide direct current voltage to the transistor bridge that is lower than the direct current supply voltage provided to driving unit over the mono cable.

11. A downhole tool according to claim 10, wherein the transistor bridge is coupled to a power supply circuit including the mono cable by means of a capacitive coupling.

12. A downhole tool according to claim 11, wherein the voltage applied to the downhole tool is at least 400 volts during a current draw of at least 4 amperes.

13. A downhole tool according to claim 10, wherein the voltage applied to the downhole tool is at least 400 volts during a current draw of at least 4 amperes.

* * * * *